United States Patent [19]
Karp et al.

[11] Patent Number: 5,588,117
[45] Date of Patent: Dec. 24, 1996

[54] SENDER-SELECTIVE SEND/RECEIVE ORDER PROCESSING ON A PER MESSAGE BASIS

[75] Inventors: Alan H. Karp, Palo Alto; Ming C. Hao, Los Altos Hills; Rajiv Gupta, Los Altos, all of Calif.

[73] Assignee: Hewlett-Packard Company, Palo Alto, Calif.

[21] Appl. No.: 247,387

[22] Filed: May 23, 1994

[51] Int. Cl.$^6$ .............................. G06F 13/14; G06F 13/24
[52] U.S. Cl. ................... 395/200.03; 395/292; 395/472; 395/486; 395/854; 395/859; 395/862
[58] Field of Search ..................................... 395/859, 872, 395/200.03, 854, 862, 472, 292, 486

[56] References Cited

U.S. PATENT DOCUMENTS

| | | | |
|---|---|---|---|
| 5,029,199 | 7/1991 | Jones et al. | 379/89 |
| 5,179,665 | 1/1993 | Roslund et al. | 395/250 |
| 5,179,708 | 1/1993 | Gyllstrom et al. | 395/725 |
| 5,218,676 | 6/1993 | Ben-Ayed et al. | 395/200 |
| 5,392,398 | 2/1995 | Meyer | 395/200 |

OTHER PUBLICATIONS

Leffler, Samuel J. et al, *The Design and Implementation of the 4.3 BSD UNIX Operating System*, Addison–Wesley Publishing Company (1989), reprinted with corrections Oct. 1990.

David K. Gifford et al, "Remote Pipe and Procedures for Efficient Distributed Communication", Massachusetts Institute of Technology, Oct. 1986, Technical Report MIT/LCS/TR-384, pp. 1–31.

Brent B. Walch, "The Sprite Remote Procedure Call System", Computer Science Division, Electrical Engineering and Computer Sciences, University of California, Berkeley, California, Jul. 2, 1986, pp. 1–34.

William Stallings, "Handbook of Computer–Communications Standards, vol. 1", Chapter 2, 1990, pp. 14–24.

*Primary Examiner*—Thomas C. Lee
*Assistant Examiner*—Rehana Perveen Krick

[57] ABSTRACT

A communications protocol using group ordered message processing is disclosed. According to the protocol, a sending application groups messages together. The messages within the groups are then processed by a receiving application in the order received, but the groups themselves are processed in the order sent. More specifically, the invention pertains to a method for receiving messages at a processor node from another processor node via a plurality of communication paths. The method includes the steps of: receiving a message having a required number of messages value, comparing the required number of messages value with a number of processed messages, and determining whether the message is ready to be processed based on the result of the comparison. The invention can also be implemented as an apparatus. As an apparatus, the invention pertains to a processing node for a communication system which transmits messages between processing nodes interconnected by multiple communication paths. The invention has numerous applications, including transaction processing, parallel processors, distributed shared memory systems, asynchronous RPC mechanism, and bulk data transfer.

22 Claims, 4 Drawing Sheets

SENDER-SELECTIVE SEND/RECEIVE ORDER PROCESSING ON A PER MESSAGE BASIS

BACKGROUND OF THE INVENTION

1. Field of the Invention

The present invention relates to a communications protocol and, more particularly, to a method and apparatus for processing messages using group ordering.

2. Description of the Related Art

Communications devices that transmit data over a network commonly use datagrams, which are packets of data. These packets arrive in any order. Most known communication protocols assume that the user desires to process the packets in the order in which they were sent.

TCP and OSI use unique sequence numbers within the packets so that the protocol can process the packets in the order sent. See, e.g., Samuel J. Leffler et at., *The Design and Implementation of the 4.3BSD UNIX Operating System*, Addison-Wesley, Reading, Ma, 1990; and William Stallings, *The Open Systems (OSI) Model and OSI-Related Protocols*, Handbook of Computer Communications Standards, Vol. 1, Stallings/MacMillan, New York, 1990. The Sprite Remote Procedure Call System (RPC) is another known protocol which uses a sequence number, but here the sequence number is not unique and indicates whether the incoming message applies to an old RPC, a current RPC, or a new RPC. See, e.g., Brent B. Welch, *The Sprite Remote Procedure Call System*, Engineering and Computer Sciences, UC Berkley, July 1986. The sequence number of all the messages associated with a particular RPC are the same, and the start of a new RPC is signaled by a message with a larger sequence number. Only one RPC can be active on the sending side at a time. Hence, a receiver can begin processing a new RPC as soon as its first message arrives, but doing so discards any subsequent messages from earlier RPC's.

The channel model is yet another communications protocol. Here, communications between nodes proceed over typed channels. Messages sent along a single channel are processed in the order sent, and messages sent along different channels are processed in the order received. Since the channels are typed, only one type of message can be sent on a channel. If ordering between messages of different types must be preserved, the channel model allows channels to be grouped. Message order is preserved for all messages within a group. Channels can be included in more than one group.

The channel model scheme imposes sender ordering on messages sent on a channel group using a separate sequence number for each group the channel belongs to. Every time a message is sent, all its sequence numbers are set to one more than the previous values for channels in the group. The receiver makes sure that a message is not processed until all sequence numbers one less than those appearing in its list have been processed. Two messages that do not have a group in common can be processed in any order. Although channel model allows ordering to be imposed on messages sent on different channels, it lacks the flexibility desired by those in the art.

Thus, what is needed is a flexible communication protocol that allows messages sent over a channel to be ordered or not ordered on a per message basis at the sender's discretion.

SUMMARY OF THE INVENTION

Broadly, the invention pertains to group ordered message processing in which a sending application is able to group messages. The messages within the groups are processed in the order received, but the groups themselves are processed in the order sent. According to the invention, messages sent over a channel can be practically and efficiently ordered or not ordered on a per message basis at the sender's discretion.

The invention pertains to a method for receiving messages at a processor node from another processor node via a plurality of communication paths. The method including the steps of: receiving a message having a required number of messages value, comparing the required number of messages value with a number of processed messages to produce a comparison result, and determining whether the message is ready to be processed based on the comparison result.

The invention can also be implemented as an apparatus. As an apparatus, the invention pertains to a processing node for a communication system which transmits messages between processing nodes interconnected by multiple communication paths. Each of the messages includes a required number of messages value. The processing node includes a receiving portion for receiving messages from another of the processing nodes. The receiving portion includes a comparator for comparing, for each of the messages received, the required number of messages value with a number of processed messages, and a message processor for processing the messages received if the comparator determines the message is ready to be processed. The processing node may further include a sending portion for sending messages to another of the processing nodes. The sending portion includes a control unit for segmenting the messages to be sent into groups, assigning a required number of messages value to each of the groups, and sending the messages together with the required number of messages value associated therewith to the another of the processing nodes.

The invention has numerous applications, including transaction processing, parallel processors, distributed shared memory systems, asynchronous RPC mechanism, and bulk data transfer. For example, consider a simplified banking example of a transaction processing system in which a bank would conventionally have to transmit transactions in a sendorder mode so that checks are cashed after deposits are recorded. However, by using group ordered message processing according to the invention, a contiguous set of deposits can be processed in any order. Likewise, a contiguous set of withdrawals can be processed in any order so long as all previous deposits have been processed. Hence, the invention provides for practical and efficient message processing.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–5. However, those skilled in the art will readily appreciate that the detailed description given herein with respect to these figures is for explanatory purposes as the invention extends beyond these limited embodiments.

The communications protocol according to the invention lets application code determine whether messages are processed in the order in which they are sent or in the order in which they are received. The decision on order of message processing is carried out dynamically by the sender of the messages without any need to send extra messages to the receivers.

Figure 1:
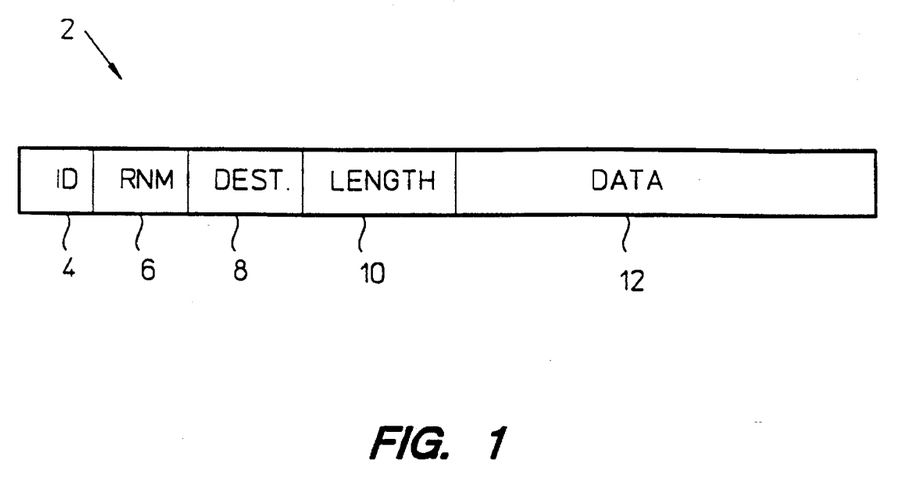
FIG. 1 is a diagram illustrating an exemplary format of a message.

FIG. 1 is a diagram illustrating an exemplary format of a message. A message format 2 illustrated i n FIG. 1 includes several fields of information, the fields include an ID 4, a required number of messages (RNM) 6, a destination 8, a length 10, and data 12. Typically, the ID 4 would include a sequence number, the destination 8 would correspond to a processor node, the data 12 would be the actual message, and the length 10 would indicate the length of the message. To facilitate the group-ordered message processing according to the invention, the RNM 6 is provided in the message format 2. The addition of the RNM 6 may or may not increase the total length of the message format 2 depending upon whether the ID 4 is shortened in view of the RNM 6. It is also possible that the RNM 6 could be concatenated or otherwise integrated into the ID 4.

Figure 2:
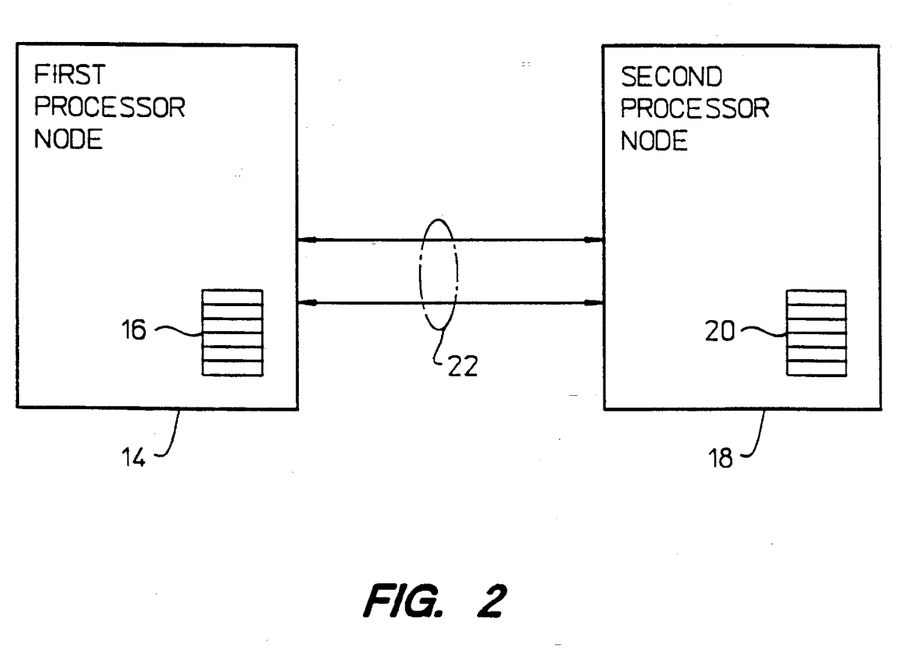
FIG. 2 is a block diagram of a communications system having a plurality of processor nodes.

FIG. 2 is a block diagram of a communications system having a plurality of processor nodes. More particularly, the communications system includes a first processor node 14 having a message queue 16 and a second processor node 18 having a message queue 20. The processor nodes 14 and 18 are interconnected by an interconnection network 22 having a plurality of communication paths. Each path within the interconnection network 22 can transport a message to or from one processor to the other. Accordingly, multiple messages can be transmitted back and forth between processors simultaneously along the paths of the interconnection network 22.

The invention provides a mixed-mode communication protocol that enables a sending application to control how messages are to be processed. Namely, the communication protocol allows the sending application to group messages. Messages within a group are processed in the order received, whereas the groups would be processed in the order sent. Thus, a sender can dynamically determine how messages are to be processed on a per message basis without any need to send extra messages to the receiver.

Figure 3:
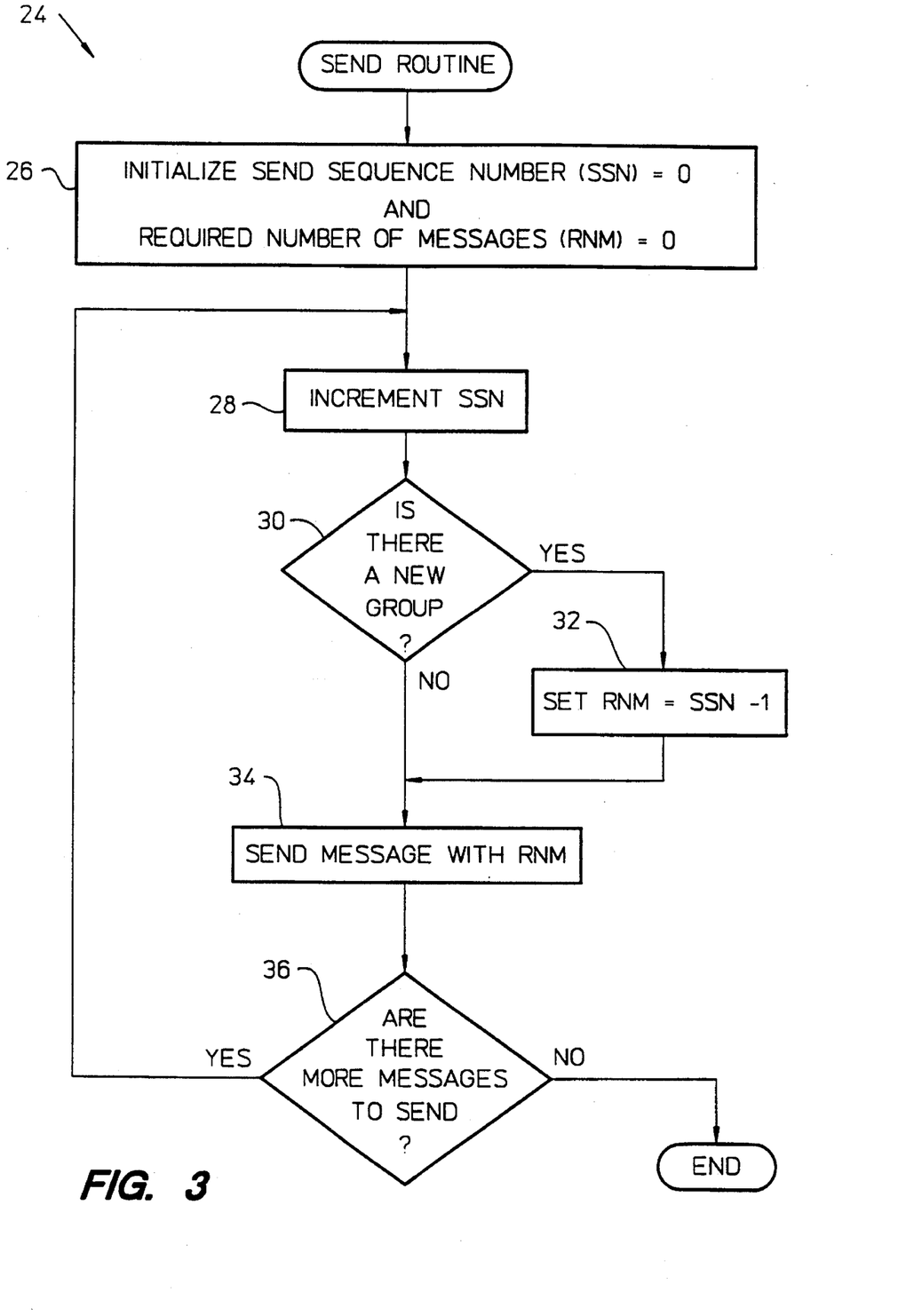
FIG. 3 is a flowchart of an embodiment of a send routine according to the invention.

FIG. 3 is a flowchart of an embodiment of a send routine according to the invention. A send routine 24 is carried out by a processor node upon receiving a message to be sent to another processing node for processing.

The send routine 24 begins by initializing 26 a send sequence number (SSN) and a required number of messages (RNM) to zero. The SSN is then incremented 28. Next, a decision 30 is made. A message call to be sent, unlike conventional calls, includes a new group flag. The new group flags are user designated and indicate whether the message to be sent is included within a new group or is within a previous group. If the message to be sent is included within a new group, then the decision block 30 causes the RNM value to be set 32 to one less than the SSN number. In effect, the RNM is thereby set to a value of the SSN of the last message of the previous group. On the other hand, if the message to be sent is within a new group (as opposed to an old group or a previous group), the RNM value is not reset, but remains as it was last set.

The message is then sent 34 with the RNM value included within its format. As discussed above, FIG. 1 provides an exemplary embodiment of the send message format.

Next, a decision 36 is made. In particular, decision 36 determines whether there are any more messages to be sent. If there are additional messages to be sent, processing returns to repeat blocks 28 through 36, otherwise the send routine ends.

Figure 4:
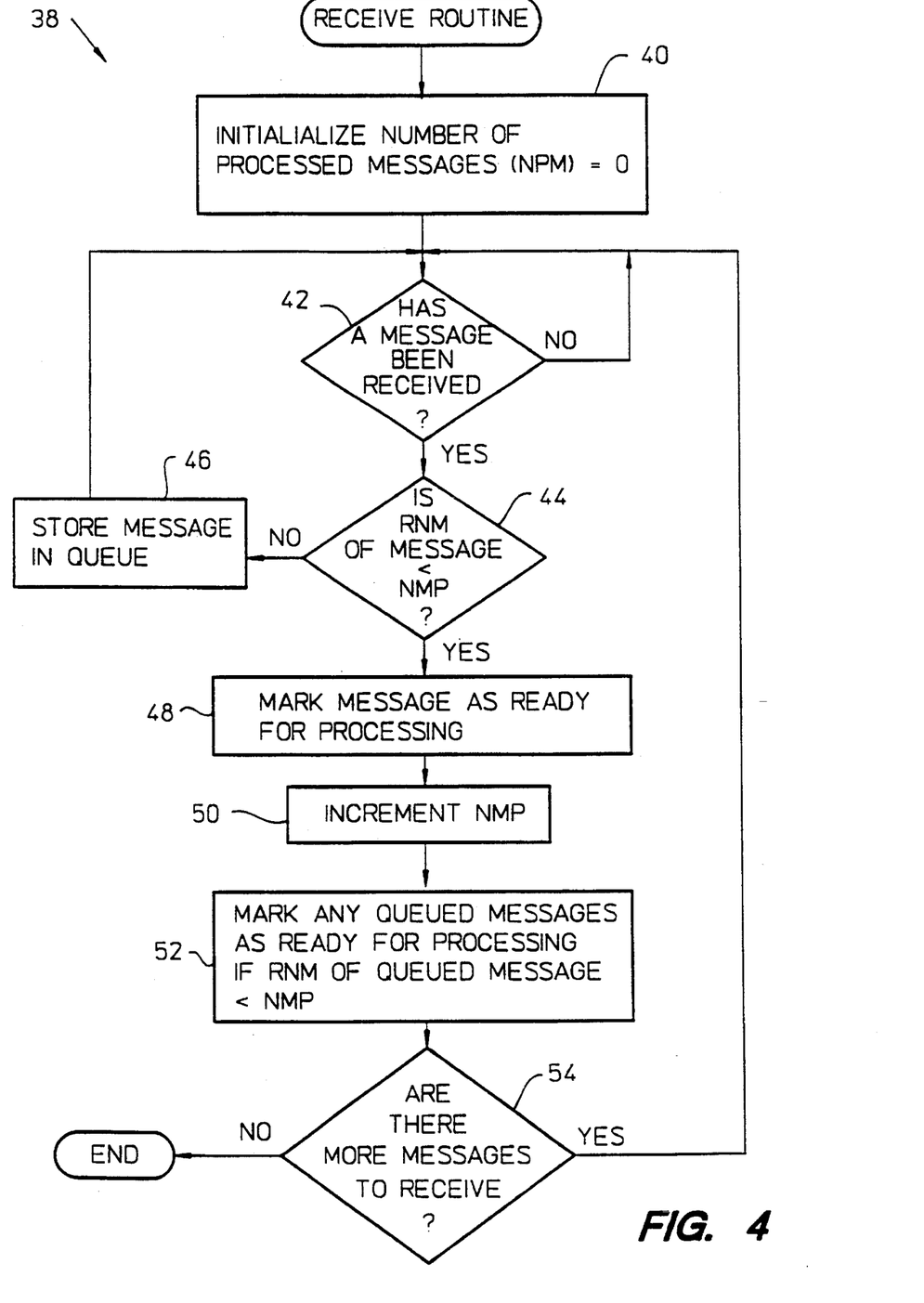
FIG. 4 is a flowchart of an embodiment of a receive routine according to the invention.

FIG. 4 is a flow chart of an embodiment of a received routine 38 in accordance with the invention. The receive routine 38 begins by initializing 40 the number of messages processed (NMP) to 0. Next, the routine 38 waits until a message to be processed has been received. This is achieved by decision block 42.

Once a message has been received, a decision 44 is made based on a comparison of the value of RNM with the value of NMP. If the value of RNM for the message is less than the value of NMP for the processor receiving the message, then the decision 44 determines that the message is able to be processed at this time. On the other hand, if the decision 44 determines that the value of RNM for the message is not less than the value of NMP, then the message is stored 46 in the corresponding message queue of the processor receiving the message. Following block 46, the processing returns to repeat blocks 42 and 44.

Once decision block 44 indicates that the value of RNM of a message received is less than the value of NMP, then the message is marked 48 as ready for processing. The processor receiving the message then processes the message. The value of NMP is then incremented 50 because another message has been processed.

Next, the receive routine 38 determines if any of the messages held in the corresponding message queue are able to be marked 52 as ready for processing. This determination is made by again comparing the value of RNM for the queued message with the value of NMP which now exists after having just processed a message and incremented the value of NMP. Block 52 is preferably implemented in recursive fashion so that as the marking and processing of queued messages increases the value of NMP, the previously queued messages can be again checked to determine if they are ready for processing using the updated value of the NMP.

Thereafter, a decision 54 determines whether there are any new messages to be received. If so, the processor returns to repeat blocks 42 through 54, otherwise the receive routine ends.

Figure 5:
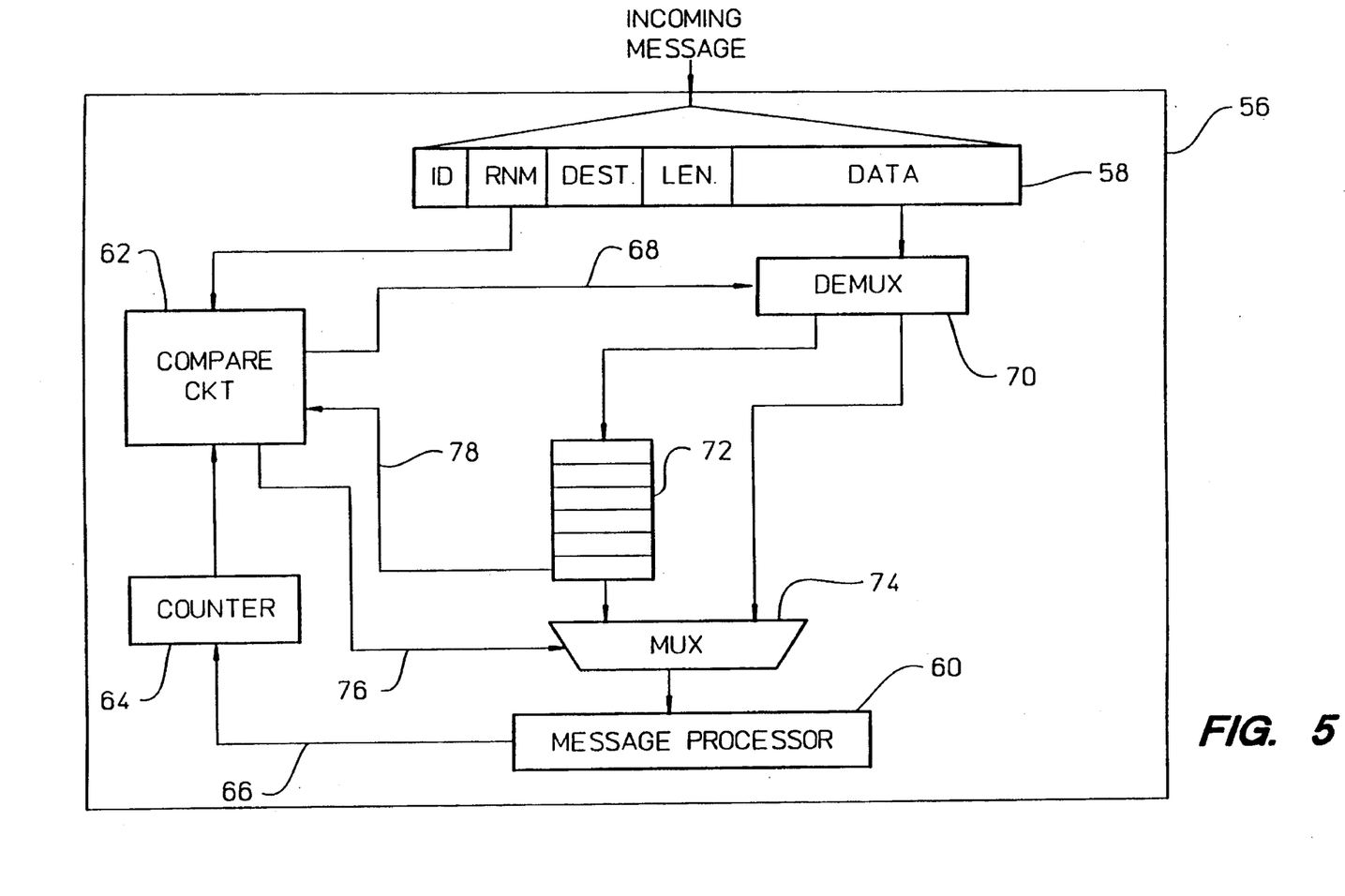
FIG.5 is a block diagram of an embodiment of a processing node.

FIG. 5 is a block diagram of an embodiment of a processing node 56. The processing node 56 receives an incoming message 58 from another processor via a network interconnect. The incoming message 58 has a message format which includes numerous fields as previously described with respect to FIG. 1. The overall objective for the message processor 56 is to process the message 58 by forwarding the data field of the message 58 to a message processor 60. However, prior to doing so, the processing node 56 must implement the receive routine to carry out the group ordering message processing according to the invention.

A compare circuit 62 operates to compare the value of RNM of the message 58 with the value of NMP which is held in a counter 64. The counter 64 is incremented by a control line 66 from the message processor 60 each time the message processor 60 processes a message. A first output signal 68 of the compare circuit 62 is provided as a select signal to a demultiplexer 70. The first output signal 68 operates to forward the data field of the incoming message 58 to either a message queue 72 or a multiplexer 74. More particularly, if the compare circuit 62 determines that the incoming message 58 is ready to be processed, the first output signal 68 causes the demultiplexer 70 to forward the data field to the multiplexer 74 which in turn supplies the data field to the message processor 60 in accordance with a second output signal 76. The second output signal 76 is another select signal produced by the compare circuit 62. On the other hand, if the compare circuit 62 determines that the incoming message 58 is not ready to be processed, the first output signal 68 causes the demultiplexer 70 to forward the data field associated with the incoming message 58 to the message queue 72.

In any case, once the message processor 60 receives the data associated with the incoming message 58, a message is processed and the counter 64 is incremented (via control line 66) so that the NMP value is increased by one. Thereafter, the compare circuit 62 compares the value of NMP with the value of RNM of the oldest queued message via line 78. If the comparison indicates that the queued message is now ready for processing, then the second output signal 76 causes the multiplexer 74 to forward the queued message from the message queue 72 to the message processor 60 so that it may be processed. The comparing for the queued messages continues in this manner until all the queued messages are checked after each change in the NMP value. For example, if the message queue 72 contains message A with RNM of 6, message B with RNM of 5, and message C with RNM of 8. Here, with current NMP of 5, the comparing for the queued messages would then cause message B to be processed, and then after incrementing current NMP to 6, the comparing would cause message A to be processed. Thereafter, with the current NMP at 7, message C would remain in the queue 72 because its RNM is 8.

The embodiment of the processing node illustrated in FIG. 5 is concerned with the receiving portion of a processing node. However, the processing node may also (or instead) include a sending portion which carries out the operations described above with reference to FIG. 3. Basically, the sending side is constructed in a conventional fashion but also includes circuitry to segment the messages to be sent into groups, assign a required number of messages value to each of the groups, and send the messages together with the required number of messages value associated therewith to the another of the processing nodes.

Although the communications protocol according to the invention pertains to group ordered message processing, the protocol is flexible enough to enforce a send order mode. In particular, by putting one less than the sequence number (SSN) in the RNM field of the message format, the messages will be processed in the order sent.

The invention allows not only the mixing of modes which heretofore was unavailable. The invention provides an elegant protocol that yields a substantial performance advantage over that associated with conventional protocol schemes. Specifically, conventional protocol schemes are inferior to that of the present invention because they rely on different message types, additional messages, or application code on both ends of the communication to effectuate message processing.

Scalable parallel processors can be made up of uniprocessors that coordinate their activities with messages. If the interconnection network used has multiple paths between each pair of nodes, there is no way to guarantee that messages are received in the order they are sent. The communications protocol according to the invention will allow communication between these processors to be achieved with a greater performance than available with conventional techniques.

The invention has other applications besides that of transaction processing or parallel processors. For example, group ordering is also useful for distributed shared memory systems, asynchronous RPC mechanism, and bulk data transfer.

In a distributed shared memory system, the memory is physically distributed among the processors, but the processors are programmed as if all the data resides in a single memory unit. References to local data are handled normally, but remote references are converted to messages. A correctly executing, shared memory, parallel program will not have any memory races. Hence, two processes running on the same processor can access memory in any order. One need only ensure that requests made by the same process are handled in the order given, but requests made by different processes can be handled in any order. The code that turns memory requests into messages can place requests from different processes into the same group. This feature is particularly useful when the parallel machine is multiprogrammed.

In an asynchronous RPC mechanism, the receiving processor need only keep track of the sending processor, not the sending process. The routine processing the RPC call would use group ordering according to the invention to enforce the ordering desired by the caller on a process by process basis while the receiver would process messages on a per processor basis.

For bulk data transfer, a large amount of data is transferred to another node and its processing begins only when the last of the data has arrived. In a send order mode, a large message would be broken up into smaller ones and sent in order, followed by a message to start working on the data. This conventional approach has the disadvantage that needless delay is caused by the waiting for messages which has been sent earlier before moving the data into the user's memory area. With group ordering according to the invention, the messages containing the data could be moved into the user's memory area as soon as they arrive.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus having a mixed-mode communications protocol that enables a sending application to select whether a particular message is to be processed in send order mode, or receive order mode, relative to other messages, comprising:

a sending portion that sends a sequence of messages to a destination, including a particular message formatted to include a data field representing desired order of processing relative to other messages of the sequence;

wherein the data field includes sequence information, which identifies the particular message relative to the other messages in the sequence, and desired queue information, which indicates to the receiving portion that the corresponding message is to be queued until a predetermined number of messages of the sequence have been processed;

a receiving portion at the destination that receives the messages of the sequence and places them in a receiver-maintained order, but that processes the particular message in the order indicated by the desired queue information, the receiving portion including a comparator that compares, for the particular message, the desired queue information with an indicator of number of messages before the particular message in the receiver-maintained-order, and provides an output, and a message processor, operatively connected to the comparator, the message processor processing the particular message in response to the output of the comparator; and wherein the particular message is processed in send-order mode by selectively setting the desired queue information to correspond to a number of prior messages in the sequence which are to be processed first, and in receive order mode by selectively setting the desired queue information to have a value indicating that no prior messages in the sequence are to be processed first.

2. An apparatus according to claim 1, wherein:

the data field includes a required number of prior messages value;

the receiving portion includes a buffer coupled to the message processor, the buffer maintaining a count of a number of messages processed by the message processor;

the comparator
compares the required number of prior messages value with the number of messages processed, and
formats the output to indicate to the message processor when the required number of messages equals the count of the number of messages processed; and the message processor processes the particular message only when the comparator indicates that the required number of prior messages corresponds to the count of the number of messages processed.

3. An apparatus according to claim 2, wherein each message carries a unique sequence number and wherein the required number of prior messages value is selected in dependence upon the sequence number of a prior message.

4. An apparatus according to claim 1, wherein each message in the sequence is formatted to include a required number of prior messages value.

5. For use with a receiving application that can be instructed to selectively process a particular message in either the order in which the message is sent, or the order in which the message is received, relative to other messages in a sequence of messages, the receiving application receiving the sequence of messages and processing the particular message in response to a comparison of, for the particular message, desired queue information contained within the particular message with a receiving-application-maintained indicator of number of messages processed before the particular message, an apparatus comprising:

a sending device that sends the sequence of messages to the receiving application, including the particular message;

a formatting mechanism that causes the particular message to include a data field representing desired order of processing relative to other messages of the sequence; wherein the data field includes
the desired queue information, which is formatted to indicate to the receiving application that the corresponding message is to be queued until a predetermined number of messages have been processed, and sequence information, which distinguishes the particular message from other messages in the sequence, and the particular message is selectively processed in send-order mode by setting the desired queue information to indicate a number of prior messages in the sequence which are to be processed first, and in receive-order mode by setting the desired queue information to have a value indicating that no prior messages in the sequence are to be processed first.

6. An apparatus according to claim 5, wherein:

the desired queue information includes a required number of prior messages which must have been processed before the current message may be processed; and the formatting mechanism formats each message in the sequence to include a data field that includes desired queue information and sequence information.

7. An apparatus according to claim 5, wherein the sequence information includes a unique sequence number, and the desired queue information is selectively caused to be one less than the unique sequence number for the particular message to cause the receiving application to process the particular message in the order sent.

8. An apparatus according to claim 5, wherein the sending device sends multiple sequences of messages, to at least one destination, the apparatus further comprising a group processing mechanism that:

groups messages according to sequence;

causes at least one message of each sequence to include a destination field; and causes each message of each sequence to include a data field, including a required number of prior messages value, each required number of prior messages value selected in dependence upon sequence information.

9. An apparatus according to claim 8, wherein:

the data field for each message also includes a unique sequence number; and the group processing mechanism includes one of hardware and machine readable code that
prioritizes each one of the multiple sequences of messages which is to be sent and assigns a unique sequence number to each message, selected in response to prioritization, such that ranges of unique sequence numbers for the sequences are mutually exclusive, and
analyzes each message to determine whether it contains a new group flag and, if a certain message contains a new group flag, sets the required number of prior messages value for the certain message to be one less than the sequence number of the certain message, such that if the certain message contains a new group flag, it will not be processed until all prior messages and prior groups have been processed.

10. For use with a sending application that can select whether a particular message is to be processed in the order sent, or in the order received, relative to other messages, the sending application sending a sequence of messages to a destination, including a particular message formatted to include a data field representing desired order of processing relative to other messages of the sequence, wherein the data field includes desired queue information, which indicates that the corresponding message is to be queued until a predetermined number of messages of the sequence have been processed, an apparatus comprising:

a receiving device that receives the messages in a received-order, but that processes the particular message in the desired order of processing in response to the desired queue information, the receiving device including a message processor that processes the messages of the sequence, a counting mechanism that maintains an indicator of the number of messages which have been received and which are to be processed before the particular message, a comparator that compares, for the particular message, the desired queue information with the indicator, and that responsively provides an output, and a control mechanism that causes the message processor to process the particular message in response to the output of the comparator;

wherein the receiving device causes the particular message to be processed in send-order mode when the desired queue information has been set to correspond to a number of prior messages in the sequence which are to be processed first, and in receive-order mode when the desired queue information has been set to have a value indicating that no prior messages in the sequence are to be processed first.

11. An apparatus according to claim 10, wherein:

the receiving device further includes a message queue that stores messages in response to the output of the comparator, the message queue storing the particular message if the desired queue information is greater than the indicator;

the receiving device further includes means for incrementing the indicator each time the message processor processes a message, and for causing the counting mechanism to maintain an incremented indicator; and the control mechanism includes machine-readable code that directs the device to, at least periodically, compare the incremented indicator with the desired queue information and cause the particular message to be removed from the queue and processed by the message processor when the desired queue information is not greater than the incremented indicator.

12. An apparatus according to claim 10, further comprising a sending device that sends a sequence of messages to a destination, including means for causing the particular message to include a data field representing desired order of processing relative to other messages of the sequence, the data field including desired queue information indicating to the receiving device that the corresponding message is to be queued until a predetermined number of messages of the sequence have been processed.

13. An apparatus according to claim 10, wherein the data field is formatted to include a required number of prior messages value and wherein:

the indicator indicates the number of messages within the sequence which have already been processed by the message processor;

the comparator
compares the required number of prior messages value with the indicator, and
causes the output to indicate to the message processor whether the required number of prior messages is greater than the indicator; and the message processor processes the particular message only when the comparator indicates that the required number of prior messages is not greater than the indicator.

14. For use with a receiving application that can be instructed to selectively process a particular message in either the order in which the message is sent, or the order in which the message is received, relative to other messages in a sequence of messages, the receiving application receiving the sequence of messages and processing the particular message in response to a comparison of, for the particular message, desired queue information contained within the particular message with an indicator of number of messages to be processed before the particular message, an apparatus comprising machine-executable code and machine-readable media which supports the code, the code directing a machine to:

send the sequence of messages to the receiving application, including the particular message;

format the particular message to include a data field representing desired order of processing relative to other messages of the sequence;

wherein
the data field includes
the desired queue information, which is formatted to indicate to the receiving application that the corresponding message is to be queued until a predetermined number of messages have been processed, and sequence information, which distinguishes the particular message from other messages in the sequence, and the particular message is selectively processed in send-order mode by setting the desired queue information to correspond to a number of prior messages in the sequence which are to be processed first, and in receive-order mode by setting the desired queue information to have a value indicating that no prior messages in the sequence are to be processed first.

15. An apparatus according to claim 14, wherein:

the desired queue information includes a required number of prior messages which must have been processed before the current message may be processed; and the codes directs the machine to format each message in the sequence to include a data field that includes desired queue information and sequence information.

16. An apparatus according to claim 14, wherein the sequence information includes a unique sequence number, and code directs the machine to selectively cause the desired queue information to be one less than the unique sequence number for the particular message to cause the receiving application to process the particular message in the order sent.

17. An apparatus according to claim 14, wherein the machine sends multiple sequences of messages, to at least one destination, and the code further directs the machine to:

group messages according to sequence;

cause at least one message of each sequence to include a destination field; and cause each message of each sequence to include a data field, including a required number of prior messages value, each required number of prior messages value selected in dependence upon sequence information.

18. An apparatus according to claim 17, wherein:

the data field for each message also includes a unique sequence number; and the code further directs the machine to
prioritize each one of the multiple sequences of messages which is to be sent and assigns a unique sequence number to each message, selected in response to prioritization, such that ranges of unique sequence numbers for the sequences are mutually exclusive, and analyze each message to determine whether it contains a new group flag and, if a certain message contains a new group flag, set the required number of prior messages value for the certain message to be one less than the sequence number of the certain message, such that if the certain message contains a new group flag, it will not be processed until all prior messages and prior groups have been processed.

19. For use with a sending application that can select whether a particular message is to be processed in the order sent, or in the order received, relative to other messages, the sending application sending a sequence of messages to a destination, including a particular message formatted to include a data field representing desired order of processing relative to other messages of the sequence, wherein the data field includes desired queue information, which indicates that the corresponding message is to be queued until a predetermined number of messages of the sequence have been processed, an apparatus comprising machine-executable code and machine-readable media which supports the code, the code directing the machine to:

receive the messages in a received-order, but process the particular message in the desired order of processing in response to the desired queue information, the code further directing the machine to implement a counting mechanism that maintains an indicator of the number of messages which have been received for processing before the particular message, a comparator that compares, for the particular message, the desired queue information with the indicator, and that responsively provides an output, and a control mechanism that causes a message processor to process the particular message in response to the output of the comparator;

wherein the code causes the particular message to be processed in send-order mode when the desired queue information has been set to correspond to a number of prior messages in the sequence which are to be processed first, and in receive-order mode when the desired queue information has been set to have a value indicating that no prior messages in the sequence are to be processed first.

20. An apparatus according to claim 19, wherein the code further directs the machine to:

implement a message queue that stores messages in response to the output of the comparator, the message queue storing the particular message if the desired queue information is greater than the indicator;

increment the indicator each time the message processor processes a message, and cause the counting mechanism to maintain an incremented indicator; and compare, at least periodically, the incremented indicator with the desired queue information, and cause the particular message to be removed from the queue and processed by the message processor when the desired queue information is not greater than the incremented indicator.

21. An apparatus according to claim 19, wherein the code further directs the machine to send a sequence of messages to a destination, and also to cause the particular message to include a data field representing desired order of processing relative to other messages of the sequence, the data field including desired queue information indicating to the receiving device that the corresponding message is to be queued until a predetermined number of messages of the sequence have been processed.

22. An apparatus according to claim 19, wherein the data field includes a required number of prior messages value, and the code further directs:

the indicator to indicate the number of messages within the sequence which have already been processed by the message processor; and the comparator to compare the required number of prior messages value with the indicator, and cause the output to indicate to the message processor whether the required number of prior messages is greater than the indicator;

wherein the message processor processes the particular message only when the comparator indicates that the required number of prior messages is not greater than the indicator.

* * * * *